(12) United States Patent
Broome et al.

(10) Patent No.: US 8,149,553 B2
(45) Date of Patent: Apr. 3, 2012

(54) ELECTROSTATIC DISCHARGE EVENT PROTECTION FOR AN INTEGRATED CIRCUIT

(75) Inventors: Steven M Broome, Apex, NC (US); Jason A Thurston, Raleigh, NC (US)

(73) Assignee: Integrated Device Technology, inc, San Jose, CA (US)

( * ) Notice: Subject to any disclaimer, the term of this patent is extended or adjusted under 35 U.S.C. 154(b) by 885 days.

(21) Appl. No.: 12/153,802

(22) Filed: May 23, 2008

(65) Prior Publication Data

US 2009/0290272 A1 Nov. 26, 2009

(51) Int. Cl.
*H02H 9/00* (2006.01)

(52) U.S. Cl. ........................................................ 361/56
(58) Field of Classification Search ...................... 361/56
See application file for complete search history.

(56) References Cited

U.S. PATENT DOCUMENTS

| | | | |
|---|---|---|---|
| 7,777,998 B2 * | 8/2010 | Stockinger et al. | 361/56 |
| 7,817,387 B2 * | 10/2010 | Khazhinsky et al. | 361/56 |
| 2004/0141268 A1 * | 7/2004 | Miller et al. | 361/56 |
| 2005/0057872 A1 * | 3/2005 | Lee et al. | 361/90 |
| 2005/0185351 A1 * | 8/2005 | Miller et al. | 361/56 |
| 2006/0114629 A1 * | 6/2006 | Wu et al. | 361/56 |
| 2007/0053120 A1 * | 3/2007 | Gauthier et al. | 361/56 |
| 2008/0062597 A1 * | 3/2008 | Chen et al. | 361/56 |

* cited by examiner

*Primary Examiner* — Ronald W Leja
(74) *Attorney, Agent, or Firm* — Marger, Johnson, et al.

(57) ABSTRACT

An integrated circuit 2 is provided with a clamp transistor 20 for providing electrostatic discharge event protection. A detector circuit 28 produces a clamp control signal for switching the clamp transistor 20 to a conductive state so as to provide the electrostatic discharge protection. The detector circuit 28 also generates an electrostatic discharge event signal 36 which is distributed elsewhere within the integrated circuit 2 and controls a protection circuit element 60, 64, 44 to force a processing control signal 40, 52 of a signal processing transistor 38, 54 into a state in which the signal processing transistor 38, 54 is more resistant to electrostatic discharge damage. The signal processing transistors 38, 54 may be P-type field effect transistors associated with a receiver 14 or a transmitter 12 connected to an external signal communication line. The use of this active protection controlled by the electrostatic discharge event signal 36 permits smaller protection diodes 22, 24 to be use with such communication signal lines and/or provide for increased electrostatic discharge protection.

10 Claims, 3 Drawing Sheets

ELECTROSTATIC DISCHARGE EVENT PROTECTION FOR AN INTEGRATED CIRCUIT

BACKGROUND OF THE INVENTION

1. Field of the Invention

This invention relates to the field of integrated circuits. More particularly, this invention relates to the provision of protection against electrostatic discharge events for integrated circuits.

2. Description of the Prior Art

It is known to provide integrated circuits with mechanisms providing protection against otherwise damaging electrostatic discharge events. Electrostatic discharge events can result from a spike in the voltage at an external pin or pad of the integrated circuit which can feed through to circuit elements within the integrated circuit and permanently damage those circuit elements.

As an example of a mechanism which can provide electrostatic discharge event protection it is known to include a clamp transistor between a power supply rail and a ground rail within an integrated circuit and to control the clamp transistor so that it provides a high capacity current path for any unwanted charge introduced by an electrostatic discharge event to pass to ground bypassing other circuit elements within the integrated circuit which would otherwise potentially be damaged by such a current. Circuit elements which are directly connected to external signal lines of the integrated circuit, such as transmitter and receiver circuits, may be provided with additional protection in the form of electrostatic discharge diodes connected between the external signal line and the power supply rail and/or the ground rail so as to be reversed biased and non-conductive during normal operation but forward biased should a voltage spike occur on the external signal line driving the external signal line out of its normal operating range. The electrostatic discharge diodes can thus provide a path to ground for the unwanted charge and reduce the possibility of damage to the circuit elements directly connected to the external signal line.

A problem with the use of electrostatic discharge diodes is that they increase the capacitance of the external signal line. This can be a problem, such as when the external signal line is a high speed serial data communication signal line connecting to a transmitter or a receiver. Such high speed communication lines are degraded in performance by too much capacitance and some communication standards define maximum amounts of capacitance which should be present. Meeting these communication standards can be difficult whilst also providing an appropriate degree of electrostatic discharge protection through the use of electrostatic diodes.

SUMMARY OF THE INVENTION

Viewed from one aspect the present invention provides an integrated circuit comprising: a power supply rail; a ground rail; at least one signal processing transistor controlled by a processing control signal to perform signal processing; a clamp transistor coupled between said power supply rail and said ground rail and controlled by a clamp control signal to provide a current path between said power supply rail and said ground rail; and a detector circuit coupled to said power supply rail and said ground rail and generating said clamp control signal, said detector circuit being responsive to a change in voltage difference between said power supply rail and said ground rail indicative of an electrostatic discharge event to generate said clamp control signal with a value that switches said clamp transistor to a conductive state in which current flow through said clamp transistor suppresses said change in voltage difference; wherein said detector circuit generates an electrostatic discharge event signal when said electrostatic discharge event is detected; and said electrostatic discharge event signal controls a protection circuit element to force said processing control signal to a protection state in which said signal processing transistor has an increased resistance to damage from said electrostatic discharge event.

The invention recognizes that within an integrated circuit having a clamp transistor providing electrostatic discharge protection, there will already exist a detector circuit for controlling the conduction through the clamp transistor. This detector circuit can provide an electrostatic discharge event signal for distribution elsewhere within the integrated circuit for controlling protection circuit elements associated with other signal processing transistors within the integrated circuit so as to place those signal processing transistors into a state with increased resistance to (it will be understood that resistance in this context is being used to indicate the degree of immunity from the problem rather than indicating an electric resistance) damage from electrostatic discharge events when the electrostatic discharge event signal is asserted. Thus, as well as an integrated circuit using a clamp transistor to help overcome electrostatic discharge events, an electrostatic discharge event signal may be used, with additionally provided protection circuit elements, to control what could otherwise be particularly vulnerable signal processing transistors within the integrated circuit and more actively protect these signal processing transistors from damage.

As an example, if the electrostatic discharge event signal is used to control a protection circuit element associated with transmitter and/or receiver circuits communicating a serial data signal via an external signal line, then the size of the electrostatic discharge diode associated with that external signal line may be safely reduced in size and capacitance in a way which permits increased performance.

It will be appreciated that the protection state adopted by the processing control signal could vary depending upon the form of and surrounding circuit elements of the signal processing transistor to be protected. In some embodiments the protection state is an undriven state in which the processing control signal has a floating voltage. This can help prevent a damaging current passing through the signal path associated with the processing control signal.

The present technique is well-suited to protecting signal processing transistors in the form of P-type field effect transistors having one of their source connection or drain connection connected to an external signal line extending outside of the integrated circuit. Such P-type field effect transistors are otherwise vulnerable to damage through electrostatic discharge events.

The P-type field effect transistor may be part of a serial data receiver and the external signal line may be an external serial data signal line.

In other embodiments and the signal processing transistor may be such that its resistance to damage is increased when the protection state switches the signal processing transistor to a non-conductive state.

A situation in which this arrangement is useful is when the signal processing transistor is an N-type field effect transistor that is part of a serial data transmitter with one of the source connection and/or drain connection of the N-type field effect transistor being connected to an external serial data signal line.

The N-type field effect transistor may be part of an output driver circuit within the serial data transmitter and the serial data transmitter may further comprise a pre-driver circuit that receives serial data signals from within the integrated circuit and generates the processing control signal. The pre-driver circuit may include the protection circuit element which is responsive to the electrostatic discharge event signal and serves to drive the processing control signal for the signal processing transistor within the output driver circuit to a ground voltage thereby rendering the N-type field effect transistor in the output buffer circuit substantially non-conductive (and accordingly electrostatic discharge event damage resistant).

The present technique is particularly useful when the signal processing transistor being protected is coupled to an external signal line which is associated with one or more protection diodes since the use of the present technique allows the protection diodes to be smaller. The technique could also be used to provide an increased level of electrostatic discharge protection with the protection diode size remaining the same.

Viewed from another aspect of the present invention provides an integrated circuit comprising: power supply rail means for distributing a power supply signal; ground rail means for distributing a ground signal; at least one signal processing transistor means for performing signal processing under control of a processing control signal; clamp transistor means coupled between said power supply rail means and said ground rail means and controlled by a clamp control signal for providing a current path between said power supply rail means and said ground rail means; and detector means coupled to said power supply rail means and said ground rail means for generating said clamp control signal, said detector means being responsive to a change in voltage difference between said power supply rail means and said ground rail means indicative of an electrostatic discharge event to generate said clamp control signal with a value that switches said clamp transistor means to a conductive state in which current flow through said clamp transistor means suppresses said change in voltage difference; wherein said detector means generates an electrostatic discharge event signal when said electrostatic discharge event is detected; and said electrostatic discharge event signal controls protection means for forcing said processing control signal to a protection state in which said signal processing transistor means has an increased resistance to damage from said electrostatic discharge event.

Viewed from a further aspect the present invention provides a method of protecting an integrated circuit from electrostatic discharge events, said integrated circuit having a power supply rail, a ground rail and at least one signal processing transistor controlled by a processing control signal to perform signal processing, said method comprising the steps of: using a clamp transistor coupled between said power supply rail and said ground rail and controlled by a clamp control signal to provide a current path between said power supply rail and said ground rail; and in responsive to a change in voltage difference between said power supply rail and said ground rail indicative of an electrostatic discharge event, generating a clamp control signal with a value that switches said clamp transistor to a conductive state in which current flow through said clamp transistor suppresses said change in voltage difference; generating an electrostatic discharge event signal when said electrostatic discharge event is detected; and controlling a protection circuit element with said electrostatic discharge event signal to force said processing control signal to a protection state in which said signal processing transistor has an increased resistance to damage from said electrostatic discharge event.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
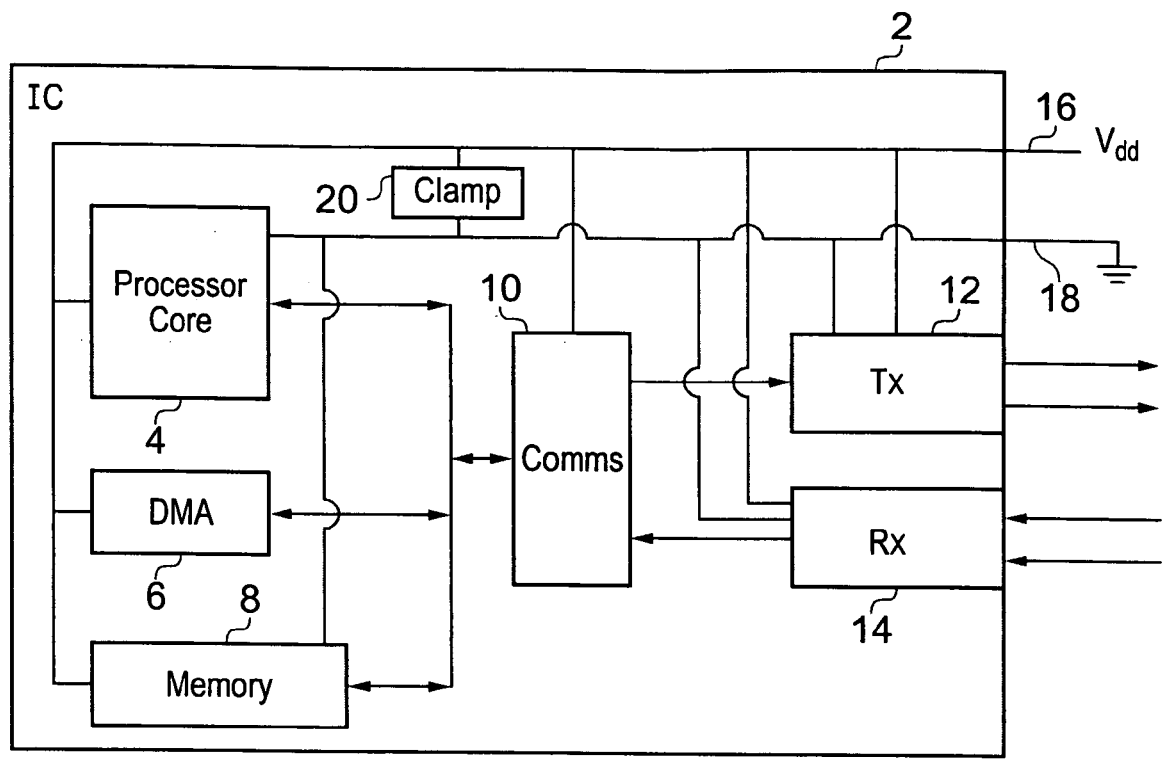
FIG. 1 schematically illustrates an integrated circuit including a clamping transistor providing electrostatic discharge protection.

FIG. 1 schematically illustrates an integrated circuit 2 including a processor core 4, a direct memory access unit 6, a memory 8, a communication circuit 10, a transmitter 12 and a receiver 14. It will be appreciated that the integrated circuit 2 can contain many other circuit elements or alternative circuit elements.

Also illustrated in FIG. 1 are a power supply rail 16 and a ground rail 18 which are connected to the various other circuit elements 4, 6, 8, 10, 12, 14 within the integrated circuit 2 so as to provide power thereto. A clamp transistor 20 is coupled between the power supply rail 16 and the ground rail 18. This clamp transistor 20 is a large and robust transistor which when activated provides a current path between the power supply rail 16 and the ground rail 18 through which charge introduced via an electrostatic discharge event may be dissipated thereby reducing the potential for damage to the more delicate circuits forming other portions of the integrated circuit 2. It will be appreciated that the electrostatic discharge event could be introduced via any of the external connections of the integrated circuit 2, such as, for example, the connections of the transmitter 12 and receiver 14 or via the power supply rail 16 or the ground rail 18. Electrostatic discharge events entering the integrated circuit 2 via any source can propagate through the integrated circuit 2 potentially causing damage to the delicate circuits therein and accordingly the clamp transistor 20 is arranged with a detector circuit which detects the voltage spikes associated with electrostatic discharge events and switches on the clamp transistor 20 in response thereto.

Figure 2:
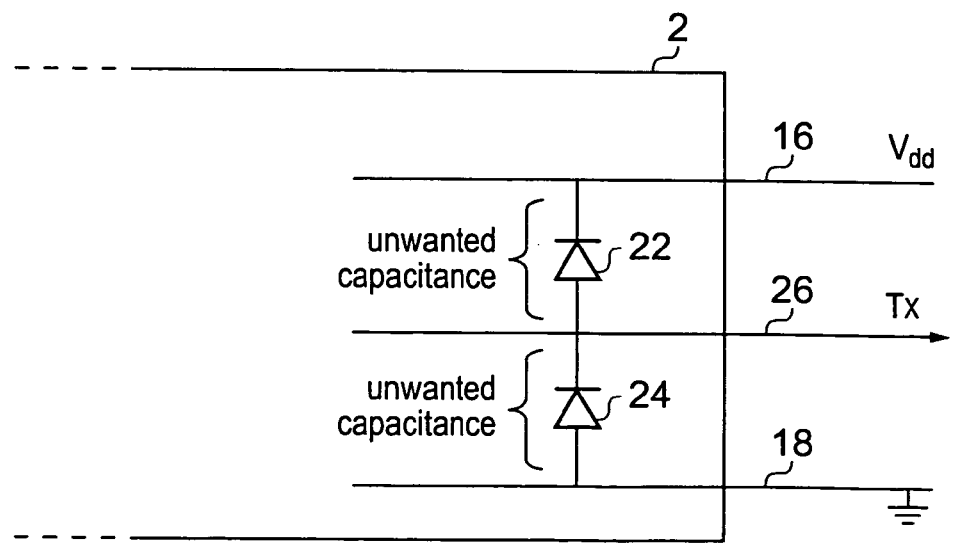
FIG. 2 schematically illustrates the use of electrostatic discharge diodes (protection diodes) associated with an external signal communication line to provide electrostatic discharge protection.

FIG. 2 illustrates protection diodes (electrostatic discharge diodes) 22, 24 associated with a serial data communication line 26 which passes external of the integrated circuit 2. These protection diodes 22, 24 are reversed biased when the voltage on the communication line 26 is normal. Should the voltage on the communication line 26 become either too high (above $V_{DD}$) or too low (below ground), then these protection diodes 22, 24 will become forward biased and allow a discharge path for the unwanted charge thereby reducing the likelihood of damage to circuit elements coupled to the communication line 26. Whilst such protection diodes 22, 24 may be effective in providing electrostatic discharge protection, they must be relatively large in size in order to provide a high capacity discharge current path and accordingly tend to have a disadvantageously large associated capacitance which can degrade the communication performance of the communication line 26 (e.g. push the capacitance of the communication line 26 outside of specified limits).

Figure 3:
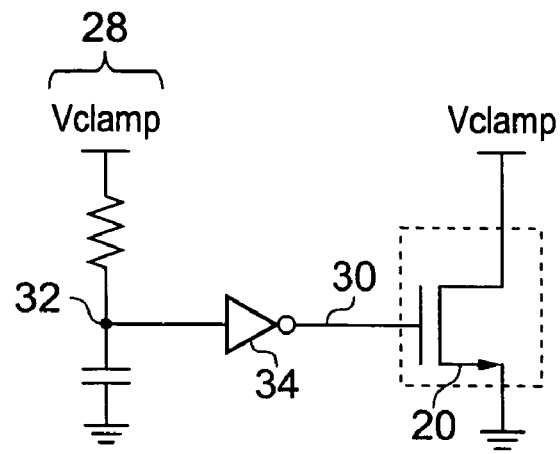
FIG. 3 illustrates a typical detection circuit and clamping transistor arrangement.

FIG. 3 illustrates an arrangement of a clamp transistor 20 and a detector circuit 28. The detector circuit 28 is in the form of resistor and a capacitor in series between the supply rail 16 and the ground rail 18. In normal operation the voltage at the node 32 will be high and the action of the inverter 34 will be to generate a clamp control signal 30 which is low thereby switching off (rendering substantially non-conductive) the clamp transistor 20. If a voltage spike occurs, then this has the effect of driving the clamp control signal 30 high thereby switching on the clamp transistor 20 and providing a high conductance discharge path between the power supply rail 16 and the ground rail 18 through which any potentially damaging charge can be dissipated.

Figure 4:
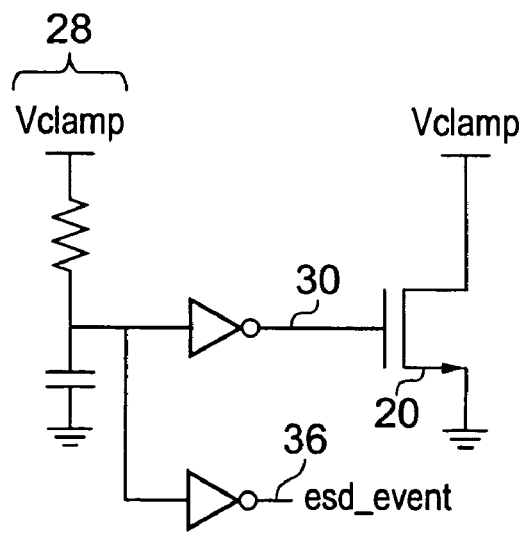
FIG. 4 schematically illustrates a modification of the arrangement of FIG. 3 in which the detection circuit additionally generates an electrostatic discharge event signal.

FIG. 4 illustrates a modification of the circuit of FIG. 3 in which the detector circuit 28 additionally generates an electrostatic discharge event signal 36. The clamp control signal 30 is still generated to control the clamp transistor 20. The electrostatic discharge event signal 36 is distributed to sensitive portions of the integrated circuit 2 so as to control protection circuit elements within those sensitive portions. These protection circuit elements force the control signal applied to a signal processing transistor which is otherwise at risk of damage due to an electrostatic discharge event into a state in which it is more resistant to that damage. The form of the protection circuit element, the relationship between the production circuit element and the signal processing transistor being protected and the protection state adopted by the processing control signal can vary depending upon the nature of the sensitive area of the integrated circuit being protected. Various examples of the use of this technique are described below. It will be appreciated that further uses of this technique are also possible and such uses are encompassed within the present technique.

Figure 5:
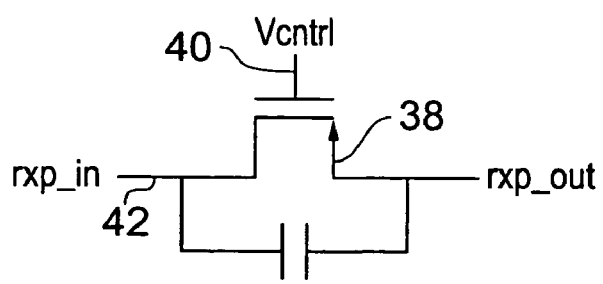
FIG. 5 illustrates a P-type field effect transistor within a receiver circuit.

FIG. 5 schematically illustrates a portion of a receiver 14 including a P-type field effect transistor 38 provided with a processing control signal 40 which renders the P-type field effect transistor 38 either conductive or non-conductive. Should a voltage spike occur on the input 42 (one of the source connection or drain connection), this can give rise to an excessive voltage difference between the body of the P-type field effect transistor 38 and the gate thereof. This excessive voltage can permanently damage the P-type field effect transistor 38.

Figure 6:
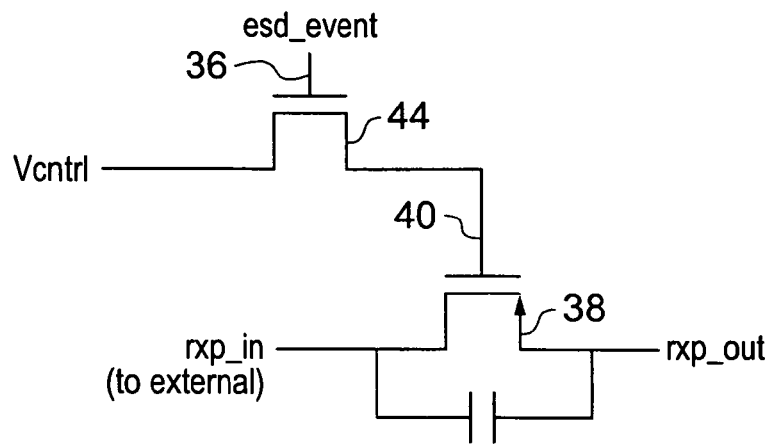
FIG. 6 schematically illustrates a modification of the receiver circuit of FIG. 5 in which a protection circuit element has been added to gate the control signal to the P-type field effect transistor.

FIG. 6 illustrates a modification of the circuit of FIG. 5, in this circuit the processing-control signal 40 supplied to the P-type field effect transistor 38 passes through protection circuit element 44 in the form of a transistor. This transistor 44 is switched by the electrostatic discharge event signal 36. When the electrostatic discharge event signal 36 is asserted indicating detection of an electrostatic discharge event by the detector circuit 28, then the transistor 44 becomes non-conductive thereby forcing the processing control signal 40 into a floating state (undriven state). When the gate of the P-type field effect transistor 38 is floating during a detected electrostatic discharge event, the potential of the floating gate will follow the potential of the body of the P-type field effect transistor 38 avoiding the occurrence of a potentially damaging excessive potential difference between these points. Thus, the P-type field effect transistor 38 is placed into a state in which it is more resistant to damage by electrostatic discharge events through the active use of the electrostatic discharge event signal 36 and the protection circuit element 44.

Figure 7:
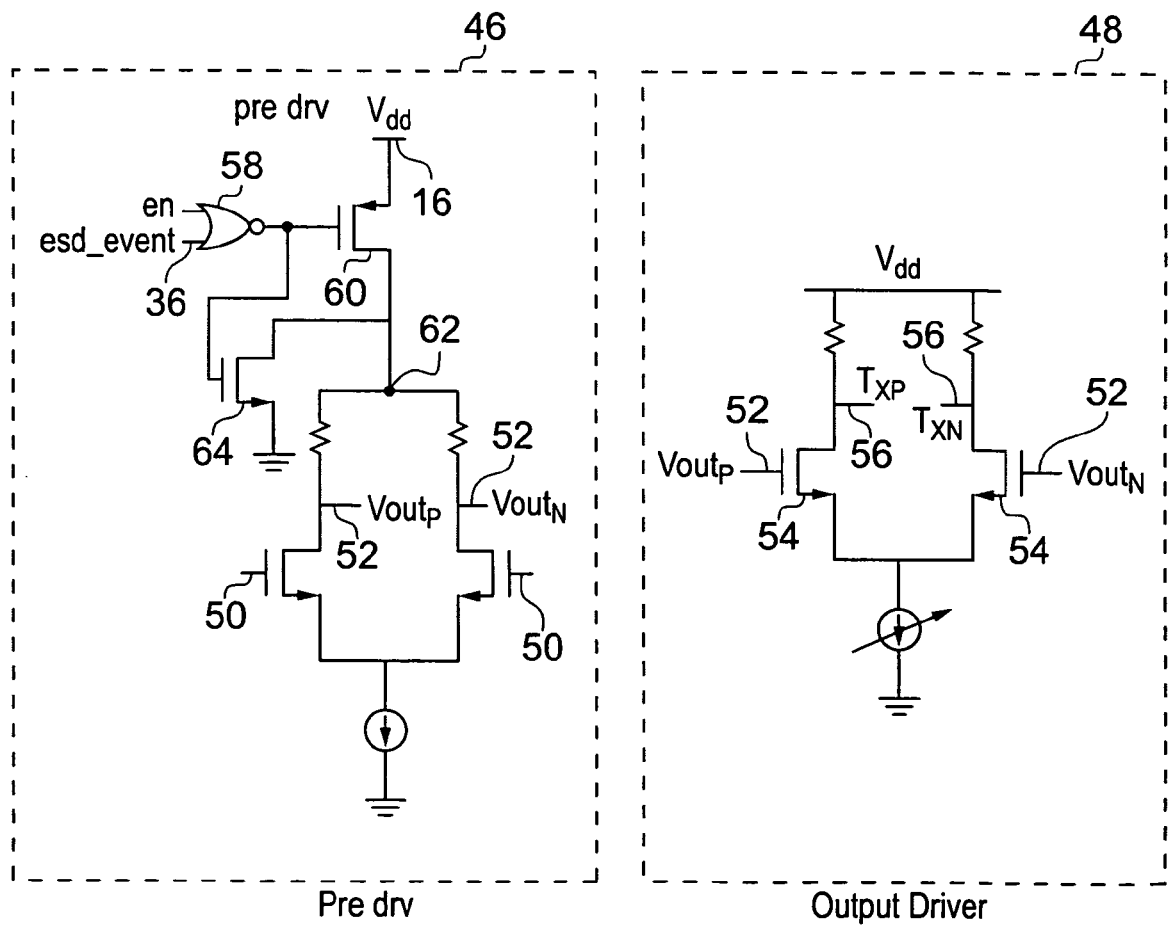
FIG. 7 schematically illustrates part of a transmitter circuit for serial data communication including an output driver and a pre-driver where the pre-driver has been modified so as to respond to an electrostatic discharge event signal to control the output driver to adopt a state more resistant to damage by such an electrostatic discharge event.

FIG. 7 illustrates part of a transmitter 14 which has been modified to provide enhanced electrostatic discharge event protection through active use of the electrostatic discharge event signal 36. The circuit illustrated includes a pre-driver circuit 46 and an output driver circuit 48. The pre-driver circuit 46 converts serial data signals 50 from within the integrated circuit 2 into processing control signals 52 which control the output driver 48 to switch its N-type field effect transistors 54 to generate the output serial data communication signals 56 which are transmitted external of the integrated circuit 2.

When the electrostatic discharge event signal 36 is asserted, this passes through NOR gate 58 and generates a signal which switches off the gate 60 thereby isolating the node 62 from the power supply rail 16 while gate 64 is switched on so as to drive the node 62 to the ground voltage. Driving the node 62 to the ground voltage has the effect of driving the processing control signals 52 low and this switches the N-type field effect transistors 54 into a nonconductive state in which they are more resistant to electrostatic discharge event damage (which may occur due to voltage spikes on the power rails 16, 18 the external signal line 56 or elsewhere).

It will be appreciated that the use of the electrostatic discharge event signal 36 to actively protect signal processing transistors 38, 54 within the integrated circuit 2 in the examples shown represents only some specific ways in which this general technique may be utilised. Those of routine skill in this technical field will appreciate that other signal processing transistors may benefit from active protection in this way to enhance their resistance to electrostatic discharge damage and/or to reduce the disadvantages of having to provide such protection through other mechanisms (e.g. protection diodes 22, 24).

Although particular embodiments of the invention have been described herein, it will be apparent that the invention is not limited thereto, and that many modifications and additions may be made within the scope of the invention. For example, various combinations of the features of the following dependent could be made with the features of the independent claims without departing from the scope of the present invention.

We claim:

1. An integrated circuit comprising:
   a power supply rail;
   a ground rail;
   at least one signal processing transistor controlled by a processing control signal to perform signal processing;
   a clamp transistor coupled between said power supply rail and said ground rail and controlled by a clamp control signal to provide a current path between said power supply rail and said ground rail; and
   a detector circuit coupled to said power supply rail and said ground rail and generating said clamp control signal, said detector circuit being responsive to a change in voltage difference between said power supply rail and said ground rail indicative of an electrostatic discharge event to generate said clamp control signal with a value that switches said clamp transistor to a conductive state in which current flow through said clamp transistor suppresses said change in voltage difference; wherein said detector circuit generates an electrostatic discharge event signal when said electrostatic discharge event is detected; and said electrostatic discharge event signal controls a protection circuit element to force said processing control signal to a protection state in which said signal processing transistor has an increased resistance to damage from said electrostatic discharge event.

2. An integrated circuit as claimed in claim 1, wherein said protection state is an undriven state in which said processing control signal has a floating voltage.

3. An integrated circuit as claimed in claim 2, wherein said signal processing transistor is a P-type field effect transistor having a source connection and a drain connection with one of said source connection and said drain connection connected to an external signal line extending outside of said integrated circuit.

4. An integrated circuit as claimed in claim 3, wherein said P-type field effect transistor is part of a serial data receiver and said external signal line is an external serial data signal line.

5. An integrated circuit as claimed in claim 1, wherein said protection state switches said signal processing transistor to a non-conductive state.

6. An integrated circuit as claimed in claim 5, wherein said signal processing transistor is a N-type field effect transistor having a source connection and a drain connection with one of said source connection and said drain connection connected to an external signal line extending outside of said integrated circuit.

7. An integrated circuit as claimed in claim 6, wherein said N-type field effect transistor is part of a serial data transmitter and said external signal line is an external serial data signal line.

8. An integrated circuit as claimed in claim 7, wherein said N-type field effect transistor is part of an output driver circuit within said serial data transmitter and said serial data transmitter further comprises a pre-driver circuit that receives serial data signals from within said integrated circuit and generates said processing control signal, said pre-driver circuit including said protection circuit element, said protection circuit element being responsive to said electrostatic discharge event signal to drive said processing control signal to a ground voltage.

9. An integrated circuit as claimed in claim 1, wherein said signal processing transistor has at least one connection connected to an external signal line extending outside of said integrated circuit, said external signal line being coupled to one or more protection diodes coupled providing a discharge path active during said electrostatic discharge event.

10. An integrated circuit comprising:

power supply rail means for distributing a power supply signal;

ground rail means for distributing a ground signal;

at least one signal processing transistor means for performing signal processing under control of a processing control signal;

clamp transistor means coupled between said power supply rail means and said ground rail means and controlled by a clamp control signal for providing a current path between said power supply rail means and said ground rail means; and detector means coupled to said power supply rail means and said ground rail means for generating said clamp control signal, said detector means being responsive to a change in voltage difference between said power supply rail means and said ground rail means indicative of an electrostatic discharge event to generate said clamp control signal with a value that switches said clamp transistor means to a conductive state in which current flow through said clamp transistor means suppresses said change in voltage difference; wherein said detector means generates an electrostatic discharge event signal when said electrostatic discharge event is detected; and said electrostatic discharge event signal controls protection means for forcing said processing control signal to a protection state in which said signal processing transistor means has an increased resistance to damage from said electrostatic discharge event.

* * * * *